E. J. HICKS.
PNEUMATIC TIRE.
APPLICATION FILED JAN. 7, 1908.
911,041.
Patented Feb. 2, 1909.
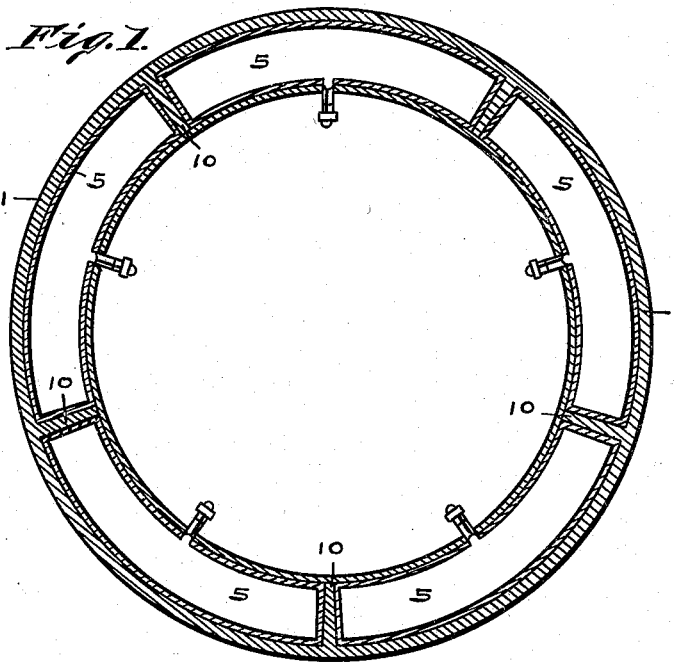
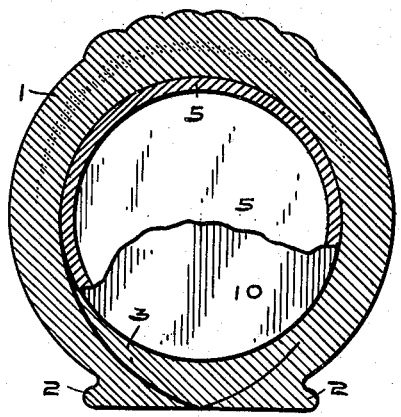
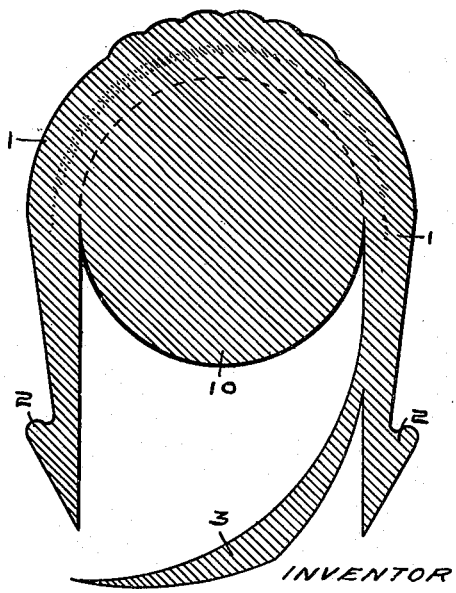
WITNESSES:
INVENTOR
Edgar J. Hicks,
ATT'YS.

UNITED STATES PATENT OFFICE.

EDGAR J. HICKS, OF INDIANAPOLIS, INDIANA.

PNEUMATIC TIRE.

No. 911,041.  Specification of Letters Patent.  Patented Feb. 2, 1909.

Application filed January 7, 1908. Serial No. 409,737.

*To all whom it may concern:*

Be it known that I, EDGAR J. HICKS, a citizen of the United States, residing at Indianapolis, in the county of Marion and State of Indiana, have invented certain new and useful Improvements in Pneumatic Tires, of which the following is a specification.

This invention relates to pneumatic tires for automobiles, bicycles and the like; and the object of the invention is to provide tires of the above class with a certain arrangement whereby in case the inner tube meets with an accident the entire wheel will not be incapacitated.

I accomplish the object of my invention by means of a pneumatic tire illustrated in the accompanying drawings, forming a part hereof, in which—

Figure 1 is a central sectional view of a complete pneumatic tire, showing my invention in operating position. Fig. 2 is a cross-section through one of the compartments of the tire, on an enlarged scale, showing the same closed and ready for service. Fig. 3 is a cross section of the tire, showing the inner peripheral walls, that contain the clenchers, spread apart as when inserting or removing the inner tube.

In the drawings, 1 designates the outer casing of a detachable pneumatic tire, and 2 the clenchers.

3 is a flap which is secured at one of its edges to the inner surface of the casing, while the free edge thereof is lapped over the meeting edges of the outer casing so as to protect the inner tube from the meeting edges of the outer casing 1.

5 are the several sections comprising the inner tube.

The description so far relates to an old and well known detachable pneumatic tire.

The present invention consists in providing the outer casing 1 with a plurality of integrally formed and equally spaced division walls 10, by which the interior of the casing 1 is divided into a plurality of compartments. The division walls 10 to their axes are formed integrally with the inner wall of the casing, while the remaining portions of said walls are severed from the casing wall in order that the sides of the casing adjacent to the clenchers 2 may be spread apart to permit the inner tubes to be inserted or removed, in the same manner in which the present single tube is inserted. See Fig. 3. The division walls 10 are formed thick enough to insure sufficient rigidity to hold the inner tubes in their respective positions, but still retain sufficient resiliency to prevent vibration when the tread of the casing where they are formed contacts with the ground.

Each of the so called compartments formed within the outer casing 1 by the division walls 10 is provided with an inner tube 5 which is closed at the ends and which snugly fits the said compartments. The tubes 5 are placed in their respective compartment when the outer casing 1 is open, as shown in Fig. 3, in the same manner as the present inner tube. The flap 3 is then snugly placed in position and the loose walls of the casing 1 are brought together, as shown in Fig. 2, when the casing is ready to be inserted into the tire-plate, not shown. Each of the inner tubes 5 is provided with a valve by which they are inflated.

By the use of a pneumatic tire herein shown, it will be readily seen that expense in adding the division walls 10 will be small when compared with the benefits derived. In the first instance, the original expense in purchasing the tubes will be but slightly in excess of the price of the present single continuous tube, and second, in case of a puncture or a blow-out in one of the small tubes 5 the expense of replacing the same will be materially less. Another important feature with the use of my tire resides in the fact that in case one of the inner tubes 5 should meet with an accident from any cause and the owner is anxious to reach his destination, or he has no desire to stop on the roadway to make the necessary repairs, he can proceed to the point of destination where the repairs can be more expeditiously made, without endangering the remaining portion of the injured wheel or the mechanism of the machine.

Having thus fully described my said invention, what I desire to secure by Letters Patent, is—

1. A pneumatic tire comprising an outer casing, a plurality of transversely extending division walls formed integrally for a portion of their circumferences with the internal wall of said casing, the remaining portions of said division walls being free from the casing wall, to permit the free portions of said division walls and the casing to be separated.

2. A pneumatic tire comprising an outer casing, a plurality of transversely extending division walls formed integrally for a portion of their circumferences with the internal wall of said casing, the remaining portions of said division walls being free from the casing wall, to permit the free portions of said division walls and the casing to be separated, said division walls being formed on a taper, and a plurality of inner tubes adapted to be inserted between said division walls.

In witness whereof, I have hereunto set my hand and seal at Indianapolis, Indiana, this 28th day of December, A. D. one thousand nine hundred and seven.

EDGAR J. HICKS. [L. S.]

Witnesses:
F. W. WOERNER,
L. B. WOERNER.